(12) United States Patent
Airoldi et al.

(10) Patent No.: US 11,060,510 B2
(45) Date of Patent: Jul. 13, 2021

(54) WIND TURBINE COOLING ARRANGEMENT

(71) Applicant: SIEMENS GAMESA RENEWABLE ENERGY A/S, Brande (DK)

(72) Inventors: Giovanni Airoldi, BG Eindhoven (NL); Thorkil Munk-Hansen, Fredericia (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 33 days.

(21) Appl. No.: 16/276,918

(22) Filed: Feb. 15, 2019

(65) Prior Publication Data

US 2019/0277263 A1 Sep. 12, 2019

(30) Foreign Application Priority Data

Feb. 20, 2018 (EP) ..................................... 18157673

(51) Int. Cl.
 *F03D 80/60* (2016.01)
(52) U.S. Cl.
 CPC ...... *F03D 80/60* (2016.05); *F05B 2220/7066* (2013.01); *F05B 2260/64* (2013.01)
(58) Field of Classification Search
 CPC .............. F03D 80/60; F05B 2220/7066; F05B 2260/64
 See application file for complete search history.

(56) References Cited

U.S. PATENT DOCUMENTS

| | | | | |
|---|---|---|---|---|
| 2014/0346781 | A1* | 11/2014 | Airoldi | .................. F03D 80/60 290/1 B |
| 2018/0038351 | A1 | 2/2018 | Jacobsen et al. | |

FOREIGN PATENT DOCUMENTS

| | | | |
|---|---|---|---|
| CN | 201714586 U | 1/2011 | |
| CN | 201999744 U | 10/2011 | |
| CN | 206555080 U | 10/2017 | |
| CN | 107687397 A | 2/2018 | |
| DE | 102014208907 A1 * | 11/2014 | ............... H02K 9/19 |
| DE | 102014208907 A1 | 11/2014 | |
| EP | 2466128 A1 | 6/2012 | |
| EP | 3222849 A1 | 9/2017 | |
| WO | WO 2011024760 A1 | 3/2011 | |

OTHER PUBLICATIONS

European Search Report dated Aug. 8, 2018 for Application No. 18157673.7.

* cited by examiner

*Primary Examiner* — Tulsidas C Patel
*Assistant Examiner* — Joseph Ortega
(74) *Attorney, Agent, or Firm* — Schmeiser, Olsen & Watts LLP

(57) ABSTRACT

Provided is a wind turbine cooling arrangement, including a first cooling circuit arranged to transport a fluid cooling medium to absorb heat from a first component group; and a second cooling circuit arranged to transport a fluid cooling medium to absorb heat from a second component group, which second cooling circuit includes a primary heat exchanger arranged to dissipate heat from the cooling medium of the second cooling circuit; and a secondary heat exchanger arranged to heat the cooling medium of the first cooling circuit. A wind turbine including a cooling arrangement, and a method of cooling components of a wind turbine is also provided.

14 Claims, 5 Drawing Sheets

WIND TURBINE COOLING ARRANGEMENT

CROSS-REFERENCE TO RELATED APPLICATIONS

This application claims priority to European application No. 18157673.7, having a filing date of Feb. 20, 2018, the entire contents of which are hereby incorporated by reference.

FIELD OF TECHNOLOGY

The following describes a cooling arrangement of a wind turbine, and a method of cooling components of a wind turbine.

BACKGROUND

Considerable quantities of heat can be generated during operation of a wind turbine. A primary source of heat is in the windings of the generator, since these are generally thick copper conductors that carry very high currents. Since the performance of a generator can decrease if the temperature in the windings becomes too high, various systems have been developed to ensure that the generator temperature remains at an acceptable level. Generally, some fluid coolant is used to absorb heat from the generator. For example, a cooling system can be realized to draw cool air through the generator air gap so that the air absorbs heat from the windings and magnets. The advantage of such a cooling arrangement is that the coolant—air—is readily available and can be easily guided through the very narrow generator air-gap. However, a problem with this type of cooling arrangement is that any moisture or airborne particles in the air can cause damage to the generator. Also, it is not always practicable to remove moisture and salt from cold air, so that the relative humidity of the air entering the generator can exceed a desired level. Moisture and salt carried in the air can lead to corrosion damage and problems with electrical circuits.

In one approach, an electric heater can be provided to heat the air intake so that moisture can be removed from the heated air. However, the need to include an electric heater adds to the complexity and cost of the wind turbine construction.

SUMMARY

An aspect relates to an improved way of cooling the components of a wind turbine generator. According to embodiments of the invention, the wind turbine cooling arrangement comprises a first cooling circuit arranged to transport a fluid cooling medium to absorb heat from a first component group; and also a second cooling circuit arranged to transport a fluid cooling medium to absorb heat from a second component group. In the inventive cooling arrangement, the second cooling circuit comprises a primary heat exchanger arranged to dissipate heat from the cooling medium of the second cooling circuit; and also a secondary heat exchanger arranged to heat the cooling medium of the first cooling circuit.

Embodiments of the invention is based on the insight that the waste heat of one cooling arrangement might be used to advantage in another, distinct cooling arrangement. Generally, waste heat is undesirable in a wind turbine and is usually expelled as quickly as possible to the environment. In the inventive cooling arrangement, much of the waste heat from the second cooling circuit is expelled in the usual manner, but a fraction of the waste heat is used for a useful function, namely to preheat the fluid intake of the first cooling circuit.

According to embodiments of the invention, the wind turbine comprises an embodiment of such a cooling arrangement for cooling components of the wind turbine.

According to embodiments of the invention, the method of cooling components of a wind turbine comprises the steps of providing a first cooling circuit to transport a fluid cooling medium to absorb heat from a first component group; providing a second cooling circuit to transport a fluid cooling medium to absorb heat from a second component group; arranging a primary heat exchanger in the second cooling circuit to dissipate heat from the cooling medium of the second cooling circuit; and arranging a secondary heat exchanger in the second cooling circuit to heat the cooling medium of the first cooling circuit.

An advantage of the inventive method is that with relatively little effort, one fluid cooling system can be augmented with a function to preheat the air intake of another fluid cooling system.

Particularly advantageous embodiments and features of the invention are given by the dependent claims, as revealed in the following description. Features of different claim categories may be combined as appropriate to give further embodiments not described herein.

In the following, it may be assumed that the wind turbine is realized as a direct-drive wind turbine. In such a wind turbine, the aerodynamic rotor (comprising the rotor blades and hub) directly turns the generator rotor. Usually, the rotor is an outer rotor and carries an arrangement of permanent magnets. The stationary armature carries the windings and is arranged about a central shaft.

In a particularly preferred embodiment of the invention, the fluid cooling medium of the first cooling circuit comprises air, and the first cooling circuit is arranged to guide a cooling airflow through the generator air-gap. To this end, an air intake fan draws air into the generator space so that it can enter the narrow air-gap. The air can enter the air-gap at one end and exit the air-gap at the other end. Alternatively, the cooling airflow can enter the air-gap and one or both ends, and can pass through radial channels between the windings into the stator interior, from where the heated air is expelled to the exterior. To this end, the hot air can be drawn into an exhaust duct using an exhaust fan, and the fan can expel the air through an outlet opening to the exterior of the nacelle.

In a particularly preferred embodiment of the invention, the fluid cooling medium of the second cooling circuit comprises a circulating liquid such as a mixture of water and glycol, contained in the circuit using an arrangement of tubes or ducts. The second cooling circuit can be arranged to cool components or heat sources such as a converter, a transformer etc., and may also be arranged to cool a bearing, to cool the lubricating oil of a fluid bearing, etc. The liquid coolant absorbs heat from the hot components and dissipates most of this heat as the heated liquid passes through the primary heat exchanger. The primary heat exchanger can be cooled by arranging it in a cooling airflow (for example at the exterior of the nacelle) or using a fan to blow a cooling airflow over the heat exchanger.

According to embodiments of the invention, the second cooling circuit also comprises a secondary heat exchanger, and this is used by the first cooling circuit to preheat the air intake. The inventive cooling arrangement comprises some means of diverting a quantity of the heated fluid coolant to the secondary heat exchanger. In a particularly preferred embodiment of the invention, a three-way valve is used for this purpose and is arranged to regulate the flow rate of the liquid cooling medium through the primary and secondary heat exchangers. In a preferred embodiment of the invention, the three-way valve can be controlled on the basis of a measured quantity such as relative humidity, temperature etc., so that a sufficient quantity of the heated fluid is diverted to the secondary heat exchanger in order to preheat the air intake to a desired level.

As mentioned above, the first cooling circuit circulates air through the generator, and the coolant airflow is drawn in from the exterior through an air intake assembly. In a particularly preferred embodiment of the invention, the secondary heat exchanger is arranged in the air intake assembly of the first cooling circuit. The air intake assembly can be arranged at any suitable location, for example at the underside of the nacelle close to the tower. This can avoid excessive levels of moisture from being drawn into the air intake, even during precipitation.

In a preferred embodiment of the invention, the first cooling circuit comprises a demister or mist eliminator arranged in the air intake assembly. A demister can be constructed as a dense wire mesh, for example, which traps even very small droplets as moisture-laden air is drawn through the wire mesh. The droplets are effectively removed from the air intake.

In a further preferred embodiment of the invention, the first cooling circuit comprises a filter arranged in the air intake assembly. The filter is realized to remove salt crystals from the preheated air intake. In a particularly preferred embodiment of the invention, the filter comprises a convoluted form with an area exceeding the area of the air intake opening. For example, the total length of the filter may significantly exceed the length of the air intake opening, and the filter can be "folded", for example formed in the shape of a "W" to fit in the air intake assembly. The greater surface area of the filter can improve its effectiveness in removing unwanted particles from the preheated air.

In a preferred arrangement, the air intake assembly comprises a walled cavity with an intake opening in a side of the nacelle, for example the underside, and the mist eliminator is arranged directly at the opening. In this preferred embodiment, the mist eliminator is followed by the secondary heat exchanger, which acts to preheat the air from the mist eliminator. Finally, the preheated air passes through the filter before entering the generator space.

In a particularly preferred embodiment of the invention, the air intake assembly is equipped with a shutter arrangement so that the air intake opening can be closed if the need arises. For example, in a situation in which the intake fan is malfunctioning, it may be preferable to stop drawing in cold air from the outside, and instead it may be better to re-circulate the air that is already inside the nacelle. This can be achieved by a suitable arrangement of actuators that can move the shutter assembly to close off the air intake. A controller can be provided to actuate the shutter assembly as necessary to close (and re-open) the air intake.

BRIEF DESCRIPTION

Some of the embodiments will be described in detail, with references to the following Figures, wherein like designations denote like members, wherein.

DETAILED DESCRIPTION

In the diagrams, like numbers refer to like objects throughout. Objects in the diagrams are not necessarily drawn to scale.

Figure 1:
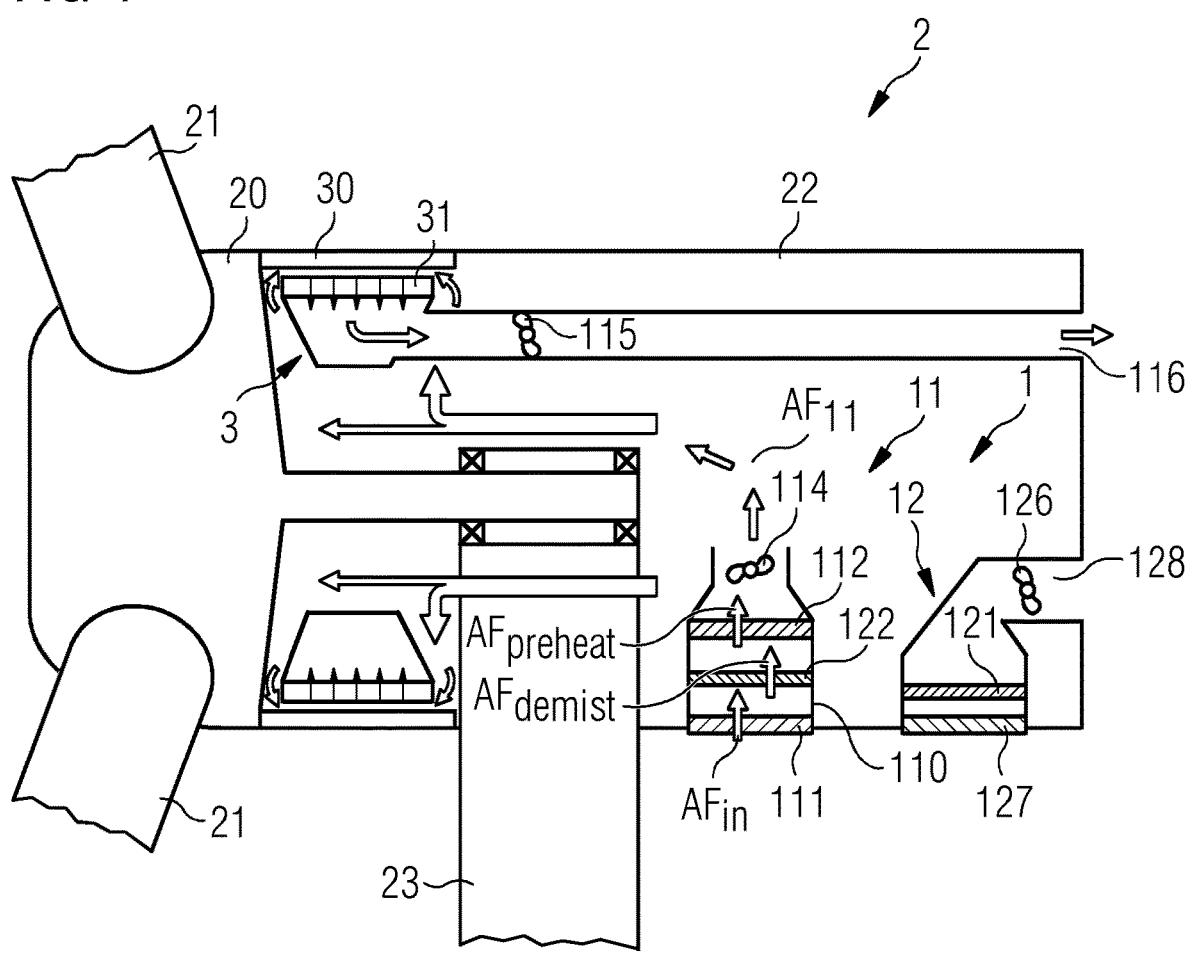
FIG. 1 shows an embodiment of a wind turbine according to embodiments of the present invention.

FIG. 1 shows an embodiment of the inventive wind turbine 2, in this case a direct-drive wind turbine 2 with a generator 3 that has an outer rotor 30 and an inner stator 31. The outer rotor 30 is turned by a hub 20 as a result of wind action on the rotor blades 21. The generator 3 and a nacelle 22 are mounted at the top of a tower 23. Components of the wind turbine 2 are cooled by an embodiment of the inventive cooling arrangement 1. In this case the generator 3 is cooled by an air-cooling system 11 and other heat sources such as a converter, a transformer, bearing lubricant etc., are cooled by a liquid cooling system 12. Air is drawn by fan 115 and exits the nacelle 22 through the outlet 116. The air-cooling system 11 and the liquid cooling system 12 are linked by arranging a secondary heat exchanger 122 of the liquid cooling system 12 in the air intake of the air-cooling system 11. In this way, the (heated) fluid passing through the secondary heat exchanger 122 can give some heat to the incoming air of the air-cooling system 11, thereby preheating it. The diagram only indicates possible positions of the two heat exchangers 121, 122 of the liquid cooling system 12 to demonstrate the inclusion of the secondary heat exchanger 122 in the air-cooling system 11, and further details of the liquid cooling system 12 will be explained with the aid of FIG. 3.

In this embodiment, an air intake assembly 110 of the air-cooling system 11 is arranged at the base of the nacelle 22, and comprises a rectangular sided cavity. At the air intake opening at the base of the cavity, the assembly 110 comprises a demister 111 or mist eliminator 111 that is realized to remove droplets of moisture from the incoming air $AF_{in}$. Following the demister 111, the secondary heat exchanger 122 of the liquid cooling system 12 preheats the partially dried air $AF_{demist}$. Following the secondary heat exchanger 122, a filter 112 removes moisture and salt crystals from the preheated air $AF_{preheat}$. The filtered air $AF_{11}$ is then allowed to enter the generator space where it can be used to cool the generator. An air intake fan 114 is operated to achieve a desired airflow rate through the components of the air intake assembly 110. The warmed and filtered air $AF_{11}$ that enters the generator space is essentially free of moisture and corrosive salt crystals. The likelihood of corrosive damage to the generator 3 can therefore be significantly reduced or even eliminated. As will be explained in FIG. 3 below, the primary heat exchanger 121 and the secondary heat exchanger 122 are both part of the same liquid cooling circuit, and a three-way valve is used to regulate the quantity of heated coolant that can pass to the secondary heat exchanger 122.

Figure 2:
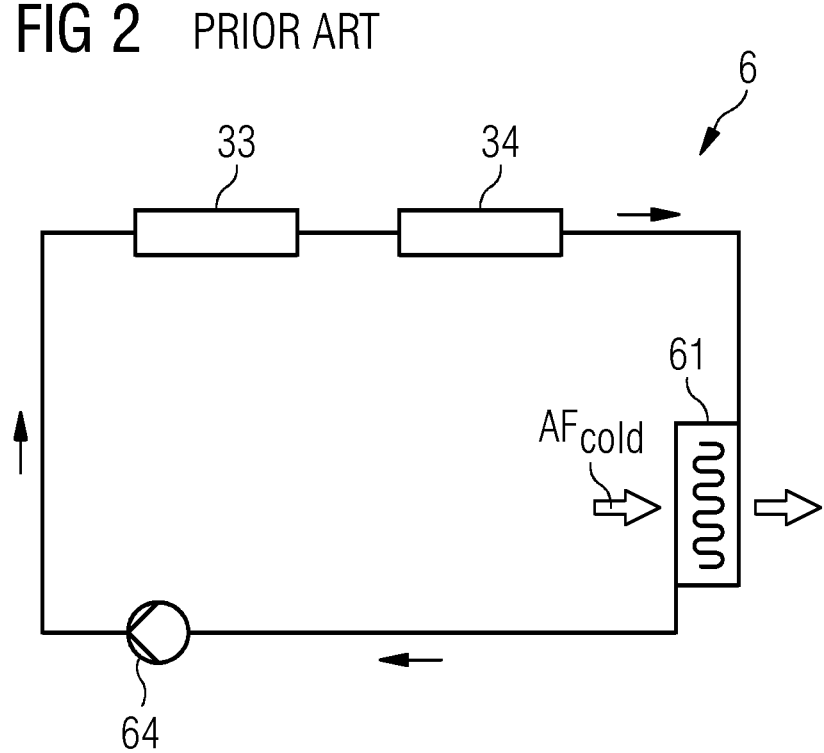
FIG. 2 shows a prior art liquid cooling system.

FIG. 2 illustrates the principle of a fluid cooling system 6 as used in the prior art to cool components of a wind turbine. Here, a liquid coolant is transported in a circuit to pass through or close by a number of heat sources 33, 34 to be cooled, for example a converter, a transformer, a bearing lubricant, etc. A pump 64 is used to achieve a desired flow rate. After being heated by the hot components 33, 34 the liquid passes through a heat exchanger 61, indicated by the convoluted form. The heat exchanger 61 can be placed in a cooling airflow $AF_{cold}$ so that the liquid coolant is cooled again before resuming its journey towards the hot components 33, 34.

Figure 3:
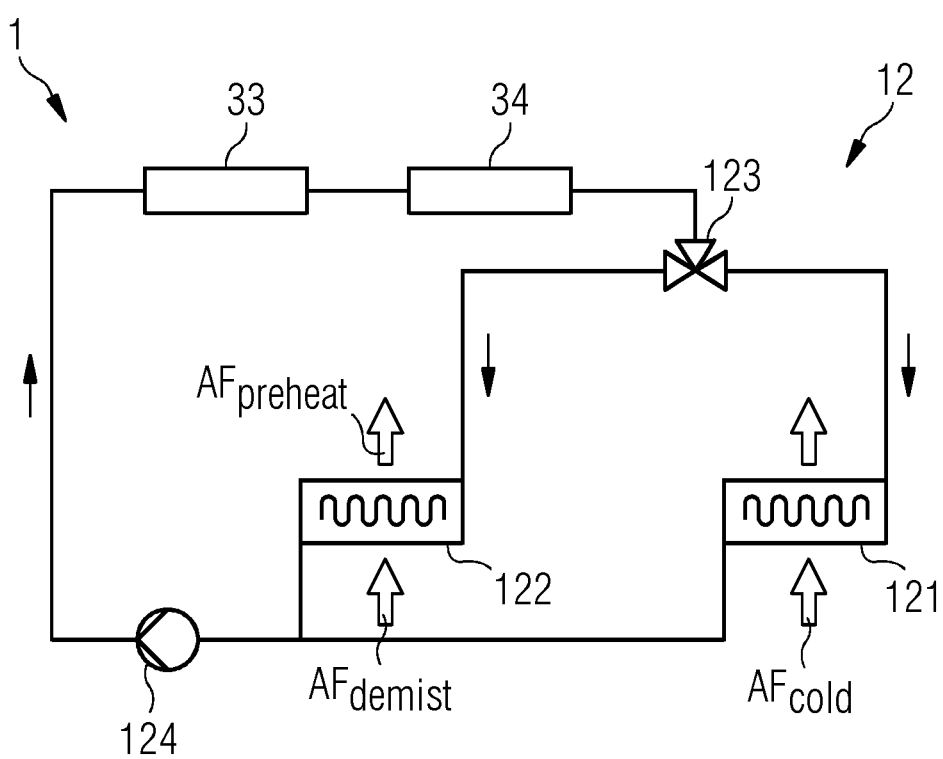
FIG. 3 shows an embodiment of the fluid cooling system as used in accordance with embodiments of the present invention.

FIG. 3 shows an embodiment of the fluid cooling system 12 of FIG. 1 as used in the method according to embodiments of the invention. Here, a liquid coolant is transported in a circuit to pass through or close by a number of components 33, 34 to be cooled, and a pump 124 is used to achieve a desired flow rate in the indicated direction. A three-way valve 123 directs a portion of the heated coolant to a primary heat exchanger 121 that is placed in a cooling airflow $AF_{cold}$. As it passes through the primary heat exchanger 121, the liquid is cooled before resuming its journey towards the hot components 33, 34.

The three-way valve 123 also directs a portion of the hot liquid coolant to a secondary heat exchanger 122 that is placed in an air intake opening of an air-cooling system of the wind turbine as described in FIG. 1 above. On its way through the secondary heat exchanger 122, the warm liquid pre-heats the air $AF_{demist}$ passing over the secondary heat exchanger 122 (at the same time, the warm liquid is cooled to some extent before resuming its journey towards the hot components 33, 34).

The three-way valve 123 is controlled to only divert a necessary quantity of hot liquid coolant to the secondary heat exchanger 122, i.e. a quantity of the heated liquid coolant that will be sufficient to preheat the air intake $AF_{demist}$ to a desired temperature. The air intake $AF_{demist}$ is only heated to a temperature at which it can be treated to reduce its relative humidity. For example, if the temperature of the exterior air is only a few degrees above freezing and has a relative humidity close to 100%, and the air intake is preheated by about 10° C. by the secondary heat exchanger 122 of the second cooling system 12, the relative humidity of the preheated air $AF_{preheat}$ can be reduced by 30%-40% or more by the filter 112, which can more easily remove moisture and salt from the preheated air. Salt crystallisation is facilitated by the step of pre-heating the air intake, and the slightly reduced cooling capacity of the air $AF_{11}$ to the generator 3 is offset by the significantly improved air quality. This improvement is achieved at low cost, since the pre-heating is performed using waste heat from the second cooling circuit 12.

Figure 4:
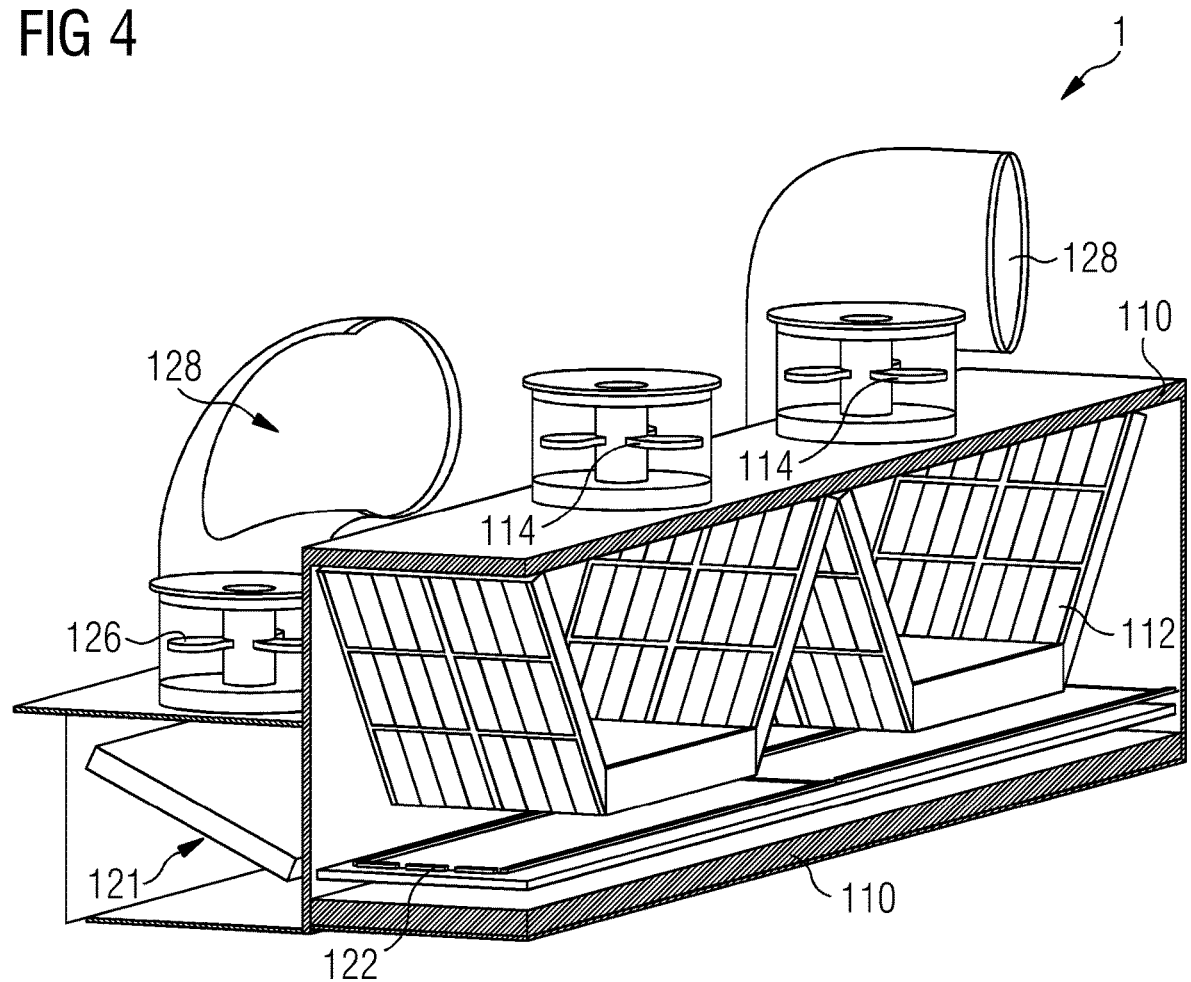
FIG. 4 shows an exemplary realisation of the cooling arrangement in accordance with embodiments of the present invention.

FIG. 4 shows a possible realisation of the inventive cooling arrangement 1. The diagram only indicates the relevant elements. The air intake assembly 110 is indicated as a rectangular-sided cavity with an opening to the exterior. Here, two air intake fans 114 are used to suck air in through the levels of the air intake assembly 110. A mist eliminator 111 is realized to cover the entire air intake opening, so air from the outside is compelled to first pass through the mist eliminator 111. The secondary heat exchanger 122 of the second cooling circuit is arranged above the mist eliminator 111. The cold air from the exterior (partially dried by the mist eliminator 111) is preheated by the hot fluid passing through the secondary heat exchanger 122. The preheated air then passes through a filter 112. In this embodiment, the filter 112 has a larger area that the cross-sectional area of the air intake assembly and is folded to fit in the cavity, in this case by assuming a "W" shape. The effectiveness of the filter 112 is improved by its convoluted shape. The distance between the secondary heat exchanger 122 and the filter 112 is chosen to provide sufficient time for any salt particles to crystallize in the preheated air that is moving towards the filter 112. The optimal distance may depend to some extent on the flowrate of the air, which in turn is determined by the capacity of the air intake fan arrangement and by the geometry of the elements in the air intake assembly 110.

Figure 5:
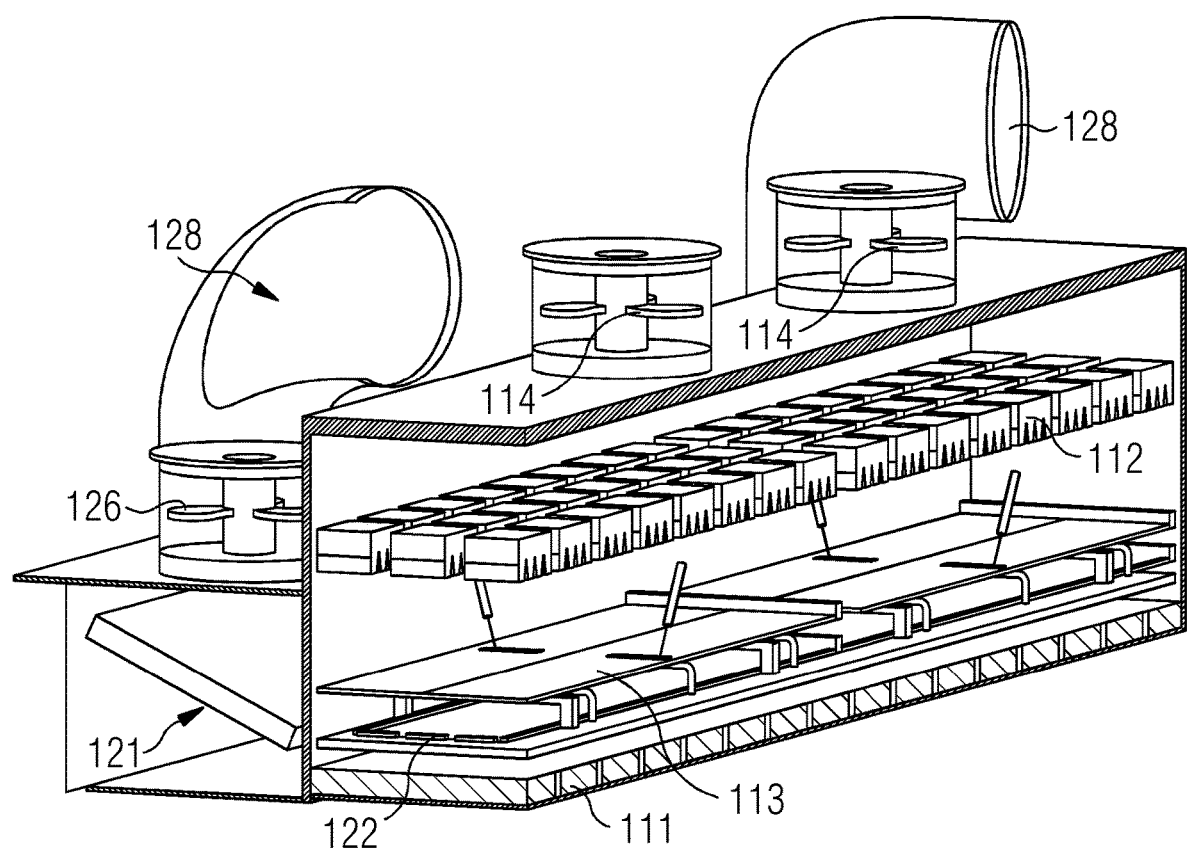
FIG. 5 shows another exemplary embodiment of the cooling arrangement.

The diagram also indicates the primary heat exchanger 121 of the second cooling circuit, and indicates an arrangement of fans 126 and exhaust ducts 128 that are used to suck a cooling airflow over the primary heat exchanger 121 and to expel the exhaust air from the nacelle. FIG. 5 shows an alternative realisation of the inventive cooling arrangement. Here, a shutter assembly 113 is provided so that the air intake can be closed off as required. The shutter assembly 113 can be operated using any suitable arrangement of actuators to open the shutters when cold air is to be drawn into the nacelle to cool the generator, or to close the shutters, for example if there is a malfunction in the air intake fan, and it is preferred to circulate the air already inside the nacelle.

Figure 6:
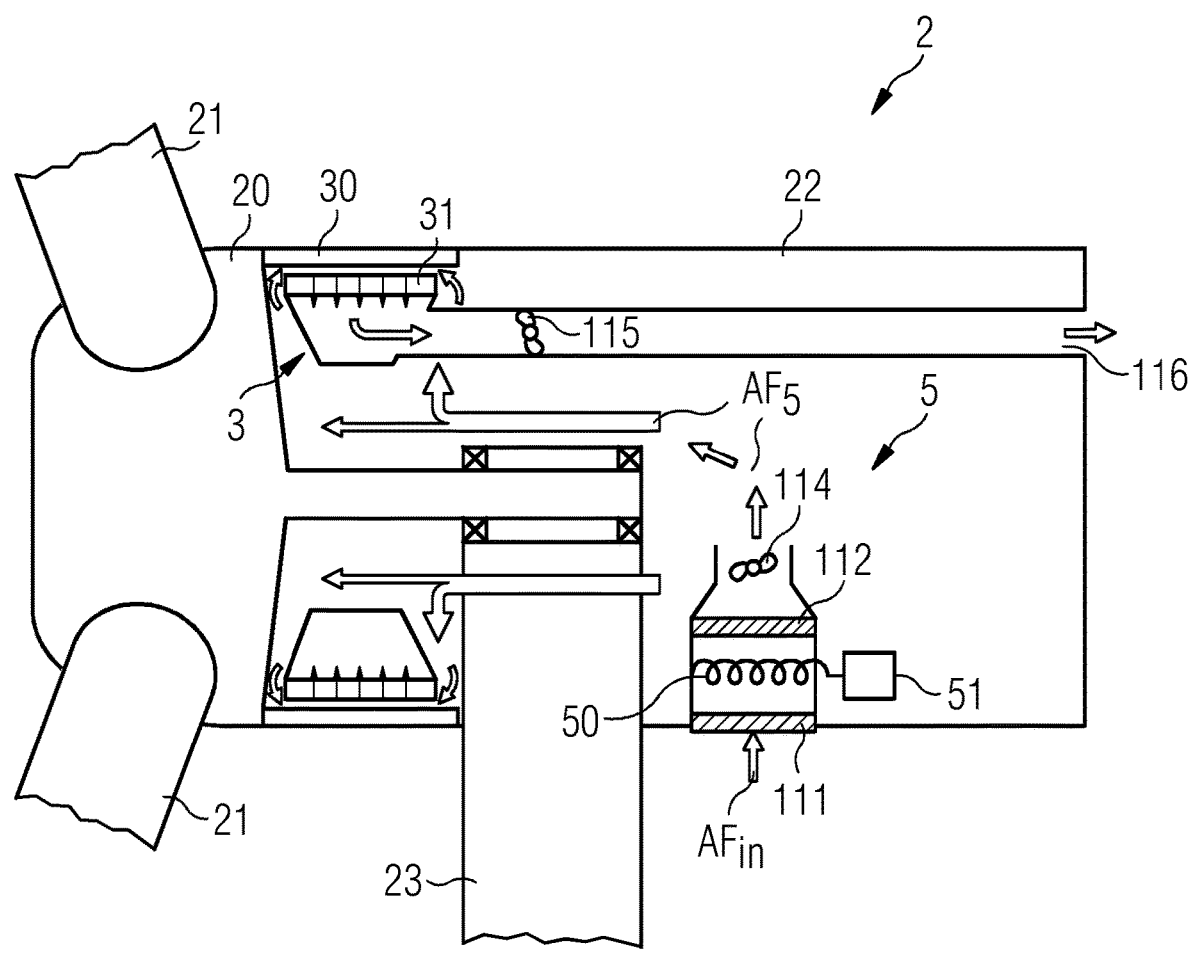
FIG. 6 shows a prior art air cooling system.

FIG. 6 shows a prior art air cooling system 5 that is used to cool the generator 3 of a wind turbine 2. Here, an air intake assembly is arranged at the base of the nacelle 22. At the air intake opening, a demister 111 is provided to remove droplets of moisture from the incoming air $AF_{in}$. Following the demister 111, an electric heater 50 is used to heat the partially dried air. A power supply 51 is required to operate the electric heater 50. A filter 112 removes moisture and salt crystals from the preheated air, and the filtered air $AF_5$ is then allowed to enter the generator space where it can be used to cool the generator 3. The performance of this cooling system depends on the reliability of the heater 50.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine cooling arrangement, comprising:
   a first cooling circuit arranged to transport a fluid cooling medium to absorb heat from a first component group;
   a second cooling circuit arranged to transport a fluid cooling medium to absorb heat from a second component group, the second cooling circuit including:
      a primary heat exchanger arranged to dissipate heat from the fluid cooling medium of the second cooling circuit, and
      a secondary heat exchanger arranged to heat the fluid cooling medium of the first cooling circuit; and
   a three-way valve arranged to regulate a flow rate of cooling medium through the primary heat exchanger and the secondary heat exchanger.

2. The cooling arrangement according to claim 1, wherein the fluid cooling medium of the first cooling circuit comprises air.

3. The cooling arrangement according to claim 1, wherein the fluid cooling medium of the second cooling circuit comprises a circulating liquid.

4. The cooling arrangement according to claim 1, wherein the secondary heat exchanger is arranged in an air intake assembly of the first cooling circuit.

5. The cooling arrangement according to claim 1, further comprising a mist eliminator arranged in an air intake assembly of the first cooling circuit.

6. The cooling arrangement according to claim 1, further comprising a filter arranged in an air intake assembly of the first cooling circuit.

7. The cooling arrangement according to claim 6, wherein the filter comprises a convoluted form with an area exceeding an area of the air intake assembly.

8. The cooling arrangement according to claim 1, further comprising a shutter assembly configured to inhibit air intake through an air intake assembly.

9. A wind turbine comprising a cooling arrangement according to claim 1 for cooling components of the wind turbine.

10. The wind turbine according to claim 9, wherein the first cooling circuit is arranged to guide a cooling airflow through the generator air-gap.

11. The wind turbine according to claim 9, wherein the second cooling circuit is configured to cool at least one of a converter, a transformer, and a bearing lubricant.

12. The wind turbine according to claim 9, wherein the wind turbine is a direct-drive wind turbine.

13. A method of cooling components of a wind turbine, comprising:
 providing a first cooling circuit to transport a fluid cooling medium to absorb heat from a first component group;
 providing a second cooling circuit to transport a fluid cooling medium to absorb heat from a second component group;
 arranging a primary heat exchanger in the second cooling circuit to dissipate heat from the fluid cooling medium of the second cooling circuit;
 arranging a secondary heat exchanger in the second cooling circuit to heat the fluid cooling medium of the first cooling circuit; and
 providing a three-way valve arranged to regulate a flow rate of cooling medium through the primary heat exchanger and the secondary heat exchanger.

14. The method of claim 13, further comprising providing a shutter assembly in an air intake assembly of the first cooling circuit and controlling the shutter assembly to inhibit air intake.

* * * * *